US008687617B2

(12) United States Patent
Agrawal et al.

(10) Patent No.: US 8,687,617 B2
(45) Date of Patent: Apr. 1, 2014

(54) WIRELESS COMMUNICATION SYSTEM WITH IMPROVED BROADCAST COVERAGE

(75) Inventors: Avneesh Agrawal, San Diego, CA (US); Durga Prasad Malladi, San Diego, CA (US); Anastasios Stamoulis, San Diego, CA (US); Ashok Mantravadi, San Diego, CA (US); Ramaswamy Murali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 12/480,928

(22) Filed: Jun. 9, 2009

(65) Prior Publication Data

US 2009/0304120 A1    Dec. 10, 2009

Related U.S. Application Data

(62) Division of application No. 11/144,211, filed on Jun. 2, 2005, now Pat. No. 8,588,203.

(60) Provisional application No. 60/577,083, filed on Jun. 4, 2004.

(51) Int. Cl.
*H04B 7/208* (2006.01)

(52) U.S. Cl.
USPC .......................................................... 370/344

(58) Field of Classification Search
USPC .......................................................... 370/344
See application file for complete search history.

(56) References Cited

U.S. PATENT DOCUMENTS

| 4,558,322 | A | 12/1985 | Tomasi |
| 4,914,651 | A | 4/1990 | Lusignan |
| 5,602,868 | A | 2/1997 | Wilson |
| 5,699,363 | A | 12/1997 | Wishart et al. |
| 5,867,478 | A | 2/1999 | Baum et al. |
| 5,943,344 | A | 8/1999 | Keller et al. |

(Continued)

FOREIGN PATENT DOCUMENTS

| CA | 2314404 A1 | 1/2002 |
| CA | 2354196 A1 | 1/2003 |

(Continued)

OTHER PUBLICATIONS

"3rd Generation Partnership Project 2 '3GPP2' CDMA2000 High Rate Packet Data Air Interface Specification," 3GPP2 C.S0024 Version 3.0, Dec. 5, 2001.

(Continued)

*Primary Examiner* — Yuwen Pan
*Assistant Examiner* — Ayodeji Ayotunde
(74) *Attorney, Agent, or Firm* — Larry J. Moskowitz (57) ABSTRACT

Techniques to transmit data with cyclic delay diversity and pilot staggering are described. For cyclic delay diversity, OFDM symbols having different cyclic delay durations are generated. The cyclic delay durations for the OFDM symbols may be selected to be time varying with respect to the cyclic delay durations for OFDM symbols transmitted by a neighboring base station. An FDM pilot is generated and multiplexed on multiple sets of subbands in different symbol periods. Waveforms for a second radio technology (e.g., W-CDMA) may be generated for data to be transmitted with this radio technology. The OFDM symbols are multiplexed onto time slots used for OFDM, and the waveforms for the second radio technology are multiplexed onto time slots used for this radio technology. One or multiple modulated signals may be generated based on the multiplexed OFDM symbols and waveforms. Each modulated signal is transmitted from a respective antenna.

21 Claims, 9 Drawing Sheets

(56) References Cited

U.S. PATENT DOCUMENTS

| | | |
|---|---|---|
| 6,031,874 A | 2/2000 | Chennakeshu et al. |
| 6,115,354 A | 9/2000 | Weck |
| 6,208,873 B1 | 3/2001 | Black et al. |
| 6,366,309 B1 | 4/2002 | Siegle |
| 6,470,024 B1 | 10/2002 | Hamalainen et al. |
| 6,529,482 B1 | 3/2003 | Lundby |
| 6,567,375 B2 | 5/2003 | Balachandran et al. |
| 6,594,473 B1 | 7/2003 | Dabak et al. |
| 6,661,771 B1 | 12/2003 | Cupo et al. |
| 6,728,233 B1 | 4/2004 | Park et al. |
| 6,747,948 B1 | 6/2004 | Sarraf et al. |
| 6,788,661 B1 | 9/2004 | Ylitalo et al. |
| 6,795,419 B2 | 9/2004 | Parantainen et al. |
| 6,842,487 B1 | 1/2005 | Larsson |
| 6,853,629 B2 | 2/2005 | Alamouti et al. |
| 6,885,630 B2 | 4/2005 | Kostic et al. |
| 6,909,702 B2 | 6/2005 | Leung et al. |
| 6,927,728 B2 | 8/2005 | Vook et al. |
| 6,940,824 B2 | 9/2005 | Shibutani |
| 6,940,827 B2 | 9/2005 | Li et al. |
| 6,961,388 B2 | 11/2005 | Ling et al. |
| 6,999,467 B2 | 2/2006 | Krauss et al. |
| 7,027,523 B2 | 4/2006 | Jalali et al. |
| 7,099,270 B2 | 8/2006 | Yamaguchi |
| 7,110,387 B1 | 9/2006 | Kim et al. |
| 7,139,237 B2 | 11/2006 | Nangia et al. |
| 7,181,170 B2 | 2/2007 | Love et al. |
| 7,273,869 B2 | 9/2007 | Lindsley et al. |
| 7,280,552 B2 | 10/2007 | Isson |
| 7,292,651 B2 | 11/2007 | Li |
| 7,313,118 B2 | 12/2007 | Geers |
| 7,379,416 B2 | 5/2008 | Yang et al. |
| 7,391,715 B2 | 6/2008 | Lee et al. |
| 7,433,418 B1 | 10/2008 | Dogan et al. |
| 7,436,903 B2 | 10/2008 | Sandhu et al. |
| 7,471,729 B2 | 12/2008 | Miyoshi |
| 7,483,366 B2 | 1/2009 | Joo et al. |
| 7,706,346 B2 | 4/2010 | Huo et al. |
| 7,920,884 B2 | 4/2011 | Agrawal et al. |
| 8,089,855 B2 | 1/2012 | Agrawal et al. |
| 2002/0049859 A1 | 4/2002 | Bruckert et al. |
| 2002/0086691 A1 | 7/2002 | Kostic et al. |
| 2002/0141447 A1 | 10/2002 | Leung et al. |
| 2002/0159422 A1 | 10/2002 | Li et al. |
| 2003/0002450 A1 | 1/2003 | Jalali et al. |
| 2003/0002518 A1 | 1/2003 | Shibutani |
| 2003/0043928 A1 | 3/2003 | Ling et al. |
| 2003/0072255 A1 | 4/2003 | Ma et al. |
| 2003/0074476 A1 | 4/2003 | Kim et al. |
| 2003/0081538 A1 | 5/2003 | Walton et al. |
| 2003/0112744 A1 | 6/2003 | Baum et al. |
| 2003/0137926 A1 | 7/2003 | Joo et al. |
| 2003/0152043 A1 | 8/2003 | Geers |
| 2003/0156570 A1 | 8/2003 | Alamouti et al. |
| 2003/0174642 A1 | 9/2003 | Yang et al. |
| 2003/0174645 A1 | 9/2003 | Paratainen et al. |
| 2003/0227866 A1 | 12/2003 | Yamaguchi |
| 2004/0023665 A1 | 2/2004 | Simmonds et al. |
| 2004/0086055 A1 | 5/2004 | Li |
| 2004/0178954 A1 | 9/2004 | Vook et al. |
| 2004/0213145 A1 | 10/2004 | Nakamura |
| 2004/0218607 A1 | 11/2004 | Hurtta et al. |
| 2004/0228294 A1 | 11/2004 | Kim et al. |
| 2005/0014464 A1 | 1/2005 | Larsson |
| 2005/0047481 A1 | 3/2005 | Lyle et al. |
| 2005/0063345 A1 | 3/2005 | Wu et al. |
| 2005/0163258 A1 | 7/2005 | Gore et al. |
| 2005/0207389 A1 | 9/2005 | Shiao et al. |
| 2005/0249177 A1 | 11/2005 | Huo et al. |
| 2005/0276344 A1 | 12/2005 | Ling et al. |
| 2006/0013168 A1 | 1/2006 | Agrawal et al. |
| 2006/0013186 A1 | 1/2006 | Agrawal et al. |
| 2006/0013325 A1 | 1/2006 | Agrawal et al. |
| 2007/0070944 A1 | 3/2007 | Rinne et al. |
| 2007/0189404 A1 | 8/2007 | Baum et al. |

FOREIGN PATENT DOCUMENTS

| | | |
|---|---|---|
| CN | 1363157 A | 8/2002 |
| DE | 4425713 C1 | 4/1995 |
| EP | 0588741 A1 | 3/1994 |
| EP | 0869647 A2 | 10/1998 |
| EP | 1061687 A1 | 12/2000 |
| EP | 1065855 A1 | 1/2001 |
| EP | 1109365 A1 | 6/2001 |
| EP | 1148673 A2 | 10/2001 |
| EP | 1221778 A1 | 7/2002 |
| EP | 1298948 A1 | 4/2003 |
| EP | 1387545 A2 | 2/2004 |
| GB | 2384958 A | 8/2003 |
| GB | 2394871 A | 5/2004 |
| JP | 7245574 | 9/1995 |
| JP | H09512156 A | 12/1997 |
| JP | 2000236343 | 8/2000 |
| JP | 2001511966 T | 8/2001 |
| JP | 2001320346 A | 11/2001 |
| JP | 2001358694 A | 12/2001 |
| JP | 2003018647 A | 1/2003 |
| JP | 2003234696 A | 8/2003 |
| JP | 200432380 | 1/2004 |
| JP | 2004064654 A | 2/2004 |
| JP | 2004064793 A | 2/2004 |
| JP | 2004096186 | 3/2004 |
| JP | 2004096445 A | 3/2004 |
| JP | 2004507121 | 3/2004 |
| JP | 2004158901 A | 6/2004 |
| JP | 2004159303 | 6/2004 |
| JP | 2004533746 | 11/2004 |
| JP | 2007518290 T | 7/2007 |
| JP | 2008502224 T | 1/2008 |
| JP | 2008502225 T | 1/2008 |
| KR | 1020040011653 | 2/2004 |
| RU | 2183387 C2 | 6/2002 |
| WO | WO9730531 A1 | 8/1997 |
| WO | WO9824250 A2 | 6/1998 |
| WO | WO9959278 A1 | 11/1999 |
| WO | WO0004728 A1 | 1/2000 |
| WO | WO0101626 A1 | 1/2001 |
| WO | WO0135537 A2 | 5/2001 |
| WO | WO0161899 A1 | 8/2001 |
| WO | WO0204086 A1 | 1/2002 |
| WO | WO0205004 A2 | 1/2002 |
| WO | WO0211317 A1 | 2/2002 |
| WO | WO0221715 A2 | 3/2002 |
| WO | WO0235735 A2 | 5/2002 |
| WO | WO0251024 A1 | 6/2002 |
| WO | WO02062002 A1 | 8/2002 |
| WO | WO02073831 A1 | 9/2002 |
| WO | WO02082834 A1 | 10/2002 |
| WO | WO03034642 A2 | 4/2003 |
| WO | WO03034645 A1 | 4/2003 |
| WO | WO03047140 A1 | 6/2003 |
| WO | WO03069824 A2 | 8/2003 |
| WO | WO2004056767 | 4/2004 |
| WO | WO2004039011 | 5/2004 |
| WO | WO2004068780 A1 | 8/2004 |
| WO | WO2004086711 A1 | 10/2004 |
| WO | WO2005004428 A1 | 1/2005 |
| WO | WO2005022811 A2 | 3/2005 |
| WO | WO2005071867 A2 | 8/2005 |
| WO | 05122425 | 12/2005 |

OTHER PUBLICATIONS

"Introduction of Multimedia Broadcast/Multicast Service (MBMS) in the Radio Access Network (RAN)", ETSI-3GPP, version 6.1, Jul. 2004, pp. 1-52.

3GPP2 CDMA2000, High Rate Packed Data Air Interface Specification, Sep. 12, 2000, sections 7-1 to 7-30.

Alasti et al., "A Discrete Multi Carrier Multiple Access Technique for Wireless Communications." Vehicular Technology Conference, vol. 2, May 18, 1998, pp. 1533-1537, New York, US.

Dammann et al., "Transmit/Receive-Antenna Diversity Techniques for OFDM Systems." European Transactions on Telecommunications, vol. 13, No. 5, Sep. 2002, pp. 531-538, Milano, IT.

(56) References Cited

OTHER PUBLICATIONS

International Search Report and Written Opinion—PCT/US05/019529, International Search Authority-European Patent Office, Oct. 11, 2005.
International Search Report and Written Opinion—PCT/US05/019541, International Search Authority-European Patent Office, Sep. 28, 2005.
International Search Report and Written Opinion—PCT/US05/019542, international Search Authority-US, Oct. 5, 2005.
International Search Report and Written Opinion—PCT/US05/019543, International Search Authority-European Patent Office, Sep. 27, 2005.
International Search Report and Written Opinion—PCT/US05/019544, International Search Authority-European Patent Office, Dec. 12, 2005.
3GPP TSG RAN WG2 #41, R2-040416, LG Electronics Inc.:"MCCH Scheduling," pp. 1-3, Malaga, Spain Feb. 16-20, 2004.
Shaoping Chen et al., "A Space-Time Coding Scheme with Maximum Diversity Gains Over Frequency-Selective Fading Channels." Personal, Indoor and Mobile Radio Communications, vol. 2, Sep. 7, 2003-Sep. 10, 2003, pp. 2567-2570, Piscataway, NJ.
Van Duc Nguyen et al., "Performance of Channel Estimation Using Pilot Symbols for a Coherent OFDM System" International Symposium on Wireless Personal Multimedia Communications, vol. 2, Nov. 12, 2000, pp. 842-847.
Weck C., "Coverage Aspects of Digital Terrestrial Television Broadcasting" EBU Review-Technical, European Broadcasting Union, No. 270, Dec. 21, 1996, pp. 19-30.
Co-pending U.S. Appl. No. 09/567,819, filed May 9, 2000.
Siemens, "Advanced interleaver for outer coding in MBMS (FDD)", 3GPP TSG-RAN WG1 Re1.6 Ad hoc, R1-040072, Jan. 2004 URL: http://www.3gpp.org/ftp/tsg_ran/WG1_RL1/TSGR1_AH/Rel-6_Ad_Hoc/Docs/Zips/R1-040072.zip (JP-N6-10-031375).
Siemens, "Outer Coding Performance for MBMS (FDD)", 3GPP TSG-RAN WG#34, R1031017, Ocotber, 2003 URL: http://www.3gpp.org/ftp/tsg_ran/WG1_RL1/TSGR1_34/Docs/Zips/R1-031017.zip (JP-N6-10-031372).
Ojanpera, T. et al., "Frames—Hybrid Multiple Access Technology," IEEE International Symposium on Spread Spectrum Techniques and Applications, No. 1, Sep. 22, 1996, pp. 320-324.

WIRELESS COMMUNICATION SYSTEM WITH IMPROVED BROADCAST COVERAGE

CROSS REFERENCES TO RELATED APPLICATIONS

The present application is a division or U.S. application Ser. No. 11/144,211 entitled "Wireless Communication System With Improved Broadcast Coverage" filed Jun. 2, 2005 which application claims priority to Provisional Application Ser. No. 60/577,083, entitled "FLO-TDD physical layer," filed Jun. 4, 2004, assigned to the assignee hereof, and expressly incorporated herein by reference.

BACKGROUND

I. Field

The present invention relates generally to communication, and more specifically to techniques for transmitting data in a wireless communication system.

II. Background

Wireless communication systems are widely deployed to provide various communication services such as voice, packet data, multi-media broadcast, text messaging, and so on. For example, a base station may transmit user-specific data to certain terminals and may broadcast multi-media data to all terminals. The terminals may be distributed throughout the coverage area of the base station. Each terminal observes a different wireless channel between that terminal and the base station. The wireless channels for the terminals may experience different channel conditions (e.g., different fading, multipath, and interference effects) and may achieve different signal-to-noise-and-interference ratios (SNRs). The SNR of a wireless channel determines its transmission capacity, which is typically quantified by a particular data rate that may be reliably transmitted via the wireless channel.

A user-specific transmission is a data transmission sent to a specific terminal. A user-specific transmission is typically encoded and transmitted in a manner such that the recipient terminal can reliably receive the transmission. This is often achieved by estimating the SNR of the wireless channel for the terminal and encoding the transmission based on the SNR estimate.

A broadcast transmission is a data transmission sent to a group of terminals or to all terminals. A broadcast transmission is typically encoded and transmitted in a manner to achieve a specified quality of service (QoS). This quality of service may be quantified, for example, by error free reception of the broadcast transmission by a specified percentage (e.g., 95%) of the terminals within a broadcast coverage area. Equivalently, the quality of service may be quantified by an outage probability, which is the percentage of the terminals within the broadcast coverage area that cannot correctly decode the broadcast transmission.

A broadcast transmission observes different wireless channels for different terminals in the broadcast coverage area. The wireless channel for each terminal may be random with respect to the wireless channels for the other terminals. Furthermore, the wireless channels for the terminals may vary over time. To ensure that the broadcast transmission can meet the specified quality of service, the data rate for the broadcast transmission is typically selected to be sufficiently low and the coding and modulation for the broadcast transmission are typically selected to be sufficiently robust so that the broadcast transmission can be reliably decoded even by the terminal with the worst channel conditions. The broadcast performance for such a system would then be dictated by the worst-case channel conditions for all of the terminals in the broadcast coverage area.

There is therefore a need in the art for techniques to more efficiently broadcast data in a wireless communication system.

SUMMARY

Techniques to transmit data with cyclic delay diversity and pilot staggering are described herein. These techniques may be used for various types of transmissions (e.g., user-specific and broadcast transmissions) and for various services (e.g., Enhanced Multimedia Broadcast/Multicast Service (E-MBMS)).

According to an embodiment of the invention, an apparatus is described which includes a modulator and a transmitter. The modulator generates multi-carrier modulation (MCM) symbols having multiple cyclic delay durations. The transmitter transmits the MCM symbols from a single antenna.

According to another embodiment, an apparatus is described which includes a modulator and a transmitter. The modulator generates Orthogonal Frequency Division Multiplexing (OFDM) symbols having multiple cyclic delay durations. The transmitter transmits the OFDM symbols from a single antenna.

According to yet another embodiment, a method is provided in which OFDM symbols having multiple cyclic delay durations are generated and transmitted from a single antenna.

According to yet another embodiment, an apparatus is described which includes means for generating OFDM symbols having multiple cyclic delay durations and means for transmitting the OFDM symbols from a single antenna.

According to yet another embodiment, an apparatus is described which includes first and second modulators and a multiplexer. The first modulator generates OFDM symbols having multiple cyclic delay durations. The second modulator generates Wideband Code Division Multiple Access (W-CDMA) waveforms for data to be transmitted with W-CDMA. The multiplexer multiplexes the OFDM symbols onto time slots used for OFDM and multiplexes the W-CDMA waveforms onto time slots used for W-CDMA.

According to yet another embodiment, a method is provided in which OFDM symbols having multiple cyclic delay durations are generated. W-CDMA waveforms are generated for data to be transmitted with W-CDMA. The OFDM symbols are multiplexed onto time slots used for OFDM, and the W-CDMA waveforms are multiplexed onto time slots used for W-CDMA.

According to yet another embodiment, an apparatus is described which includes means for generating OFDM symbols having multiple cyclic delay durations, means for generating W-CDMA waveforms for data to be transmitted with W-CDMA, means for multiplexing the OFDM symbols onto time slots used for OFDM, and means for multiplexing the W-CDMA waveforms onto time slots used for W-CDMA.

According to yet another embodiment, an apparatus is described which includes a receiver and a demodulator. The receiver receives OFDM symbols from at least two base stations, with the OFDM symbols from each base station having multiple cyclic delay durations. The demodulator processes the received OFDM symbols to recover data transmitted by the at least two base stations.

According to yet another embodiment, a method is provided in which OFDM symbols are received from at least two base stations, with the OFDM symbols from each base station having multiple cyclic delay durations. The received OFDM symbols are processed to recover data transmitted by the at least two base stations.

According to yet another embodiment, an apparatus is described which includes means for receiving OFDM symbols from at least two base stations, with the OFDM symbols from each base station having multiple cyclic delay durations, and means for processing the received OFDM symbols to recover data transmitted by the at least two base stations.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
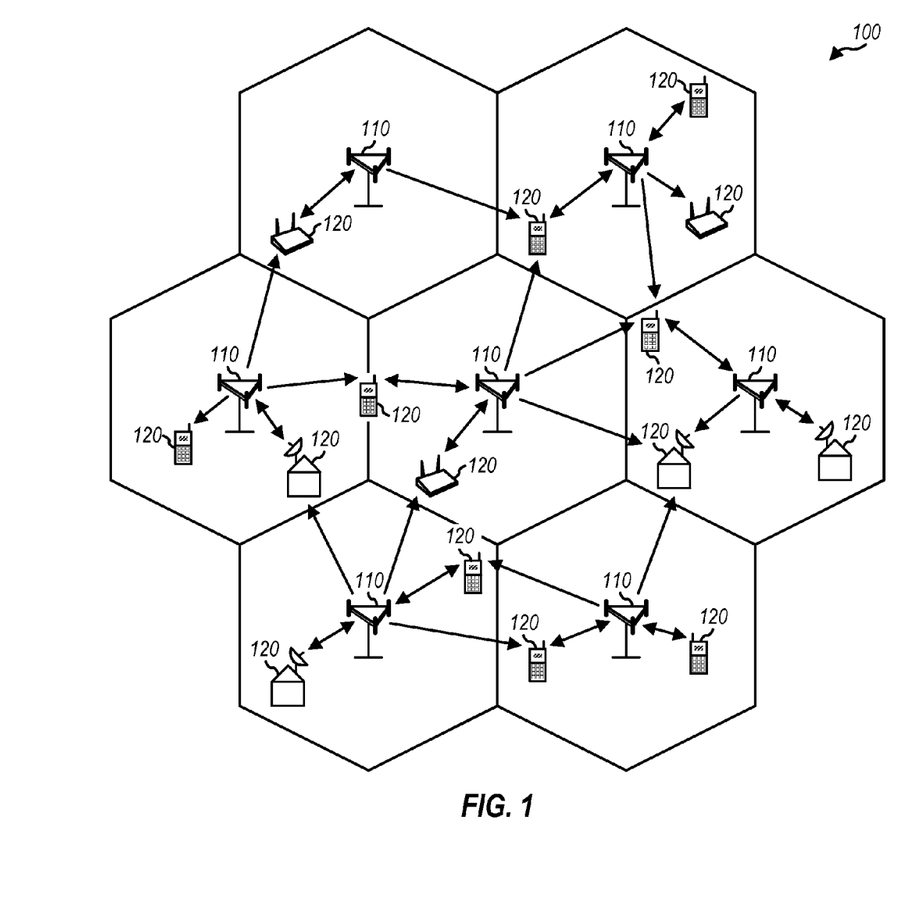
FIG. 1 shows a wireless communication system.

FIG. 1 shows a wireless communication system 100 with multiple base stations 110 and multiple terminals 120. A base station is generally a fixed station that communicates with the terminals and may also be called a Node B, an access point, a base transceiver subsystem (BTS), or some other terminology. Each base station 110 provides communication coverage for a particular geographic area. The term "cell" can refer to a base station and/or its coverage area depending on the context in which the term is used. Terminals 120 may be dispersed throughout the system. A terminal may be fixed or mobile and may also be called a mobile station, a wireless device, a user equipment, a user terminal, a subscriber unit, or some other terminology. The terms "terminal" and "user" are used interchangeably herein. A terminal may communicate with zero, one, or multiple base stations on the downlink and/or uplink at any given moment. The downlink (or forward link) refers to the communication link from the base stations to the terminals, and the uplink (or reverse link) refers to the communication link from the terminals to the base stations.

The transmission techniques described herein may be used for various radio technologies such as W-CDMA, cdma2000, IS-856, other versions of CDMA, OFDM, Interleaved Frequency Division Multiple Access (IFDMA) (which is also called Distributed FDMA), Localized FDMA (LFDMA) (which is also called Narrowband FDMA or Classical FDMA), Global System for Mobile Communications (GSM), and so on. W-CDMA and cdma2000 utilize direct sequence CDMA (DS-CDMA), which spectrally spreads a narrowband signal over the entire system bandwidth. OFDM, IFDMA, and LFDMA are multi-carrier radio technologies that effectively partition the overall system bandwidth into multiple (S) orthogonal frequency subbands. These subbands are also called tones, subcarriers, bins, and frequency channels. Each subband is associated with a respective subcarrier that may be modulated with data. OFDM transmits modulation symbols in the frequency domain on all or a subset of the S subbands. IFDMA transmits modulation symbols in the time domain on subbands that are uniformly distributed across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the transmission techniques may also be used for other radio technologies not mentioned above. For clarity, the transmission techniques are specifically described below for W-CDMA and OFDM.

Figure 2:
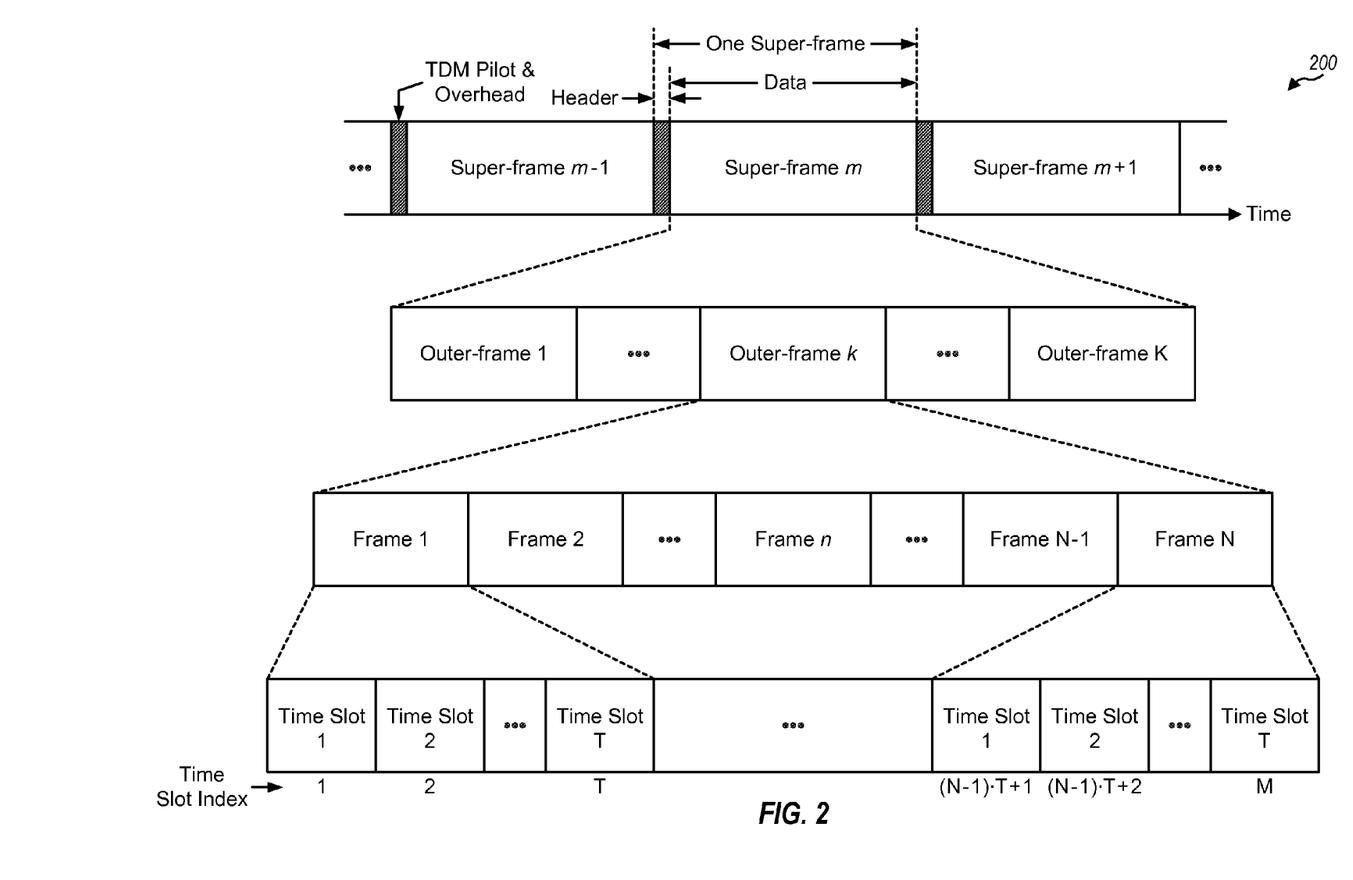
FIG. 2 shows a 4-tier frame structure that supports W-CDMA and OFDM.

FIG. 2 shows an exemplary 4-tier super-frame structure 200 that may be used to transmit data, pilot, and signaling in system 100. The transmission time line is partitioned into super-frames, with each super-frame having a predetermined time duration, e.g., approximately one second. For the embodiment shown in FIG. 2, each super-frame includes (1) a header field for a time division multiplexed (TDM) pilot and overhead/control information and (2) a data field for traffic data and a frequency division multiplexed (FDM) pilot. The TDM pilot may be used for synchronization, e.g., super-frame detection, frequency error estimation, and timing acquisition. The TDM and FDM pilots may be used for channel estimation. The overhead information for each super-frame may convey various parameters for the transmissions sent in that super-frame, e.g., the time slots and the coding and modulation used for each transmission.

The data field of each super-frame is partitioned into K equal-size outer-frames to facilitate data transmission, where K>1. Each outer-frame is partitioned into N frames, and each frame is further partitioned into T time slots, where N>1 and T>1. For example, each super-frame may include four outer-frames (K=4), each outer-frame may include 32 frames (N=32), and each frame may include 15 time slots (T=15). If each frame has a duration of 10 milliseconds (ms), then each outer-frame has a duration of 320 ms, and each super-frame has a duration of approximately 1.28 seconds. The super-frame, outer-frame, frame, and time slot may also be referred to by some other terminology.

Figure 3:
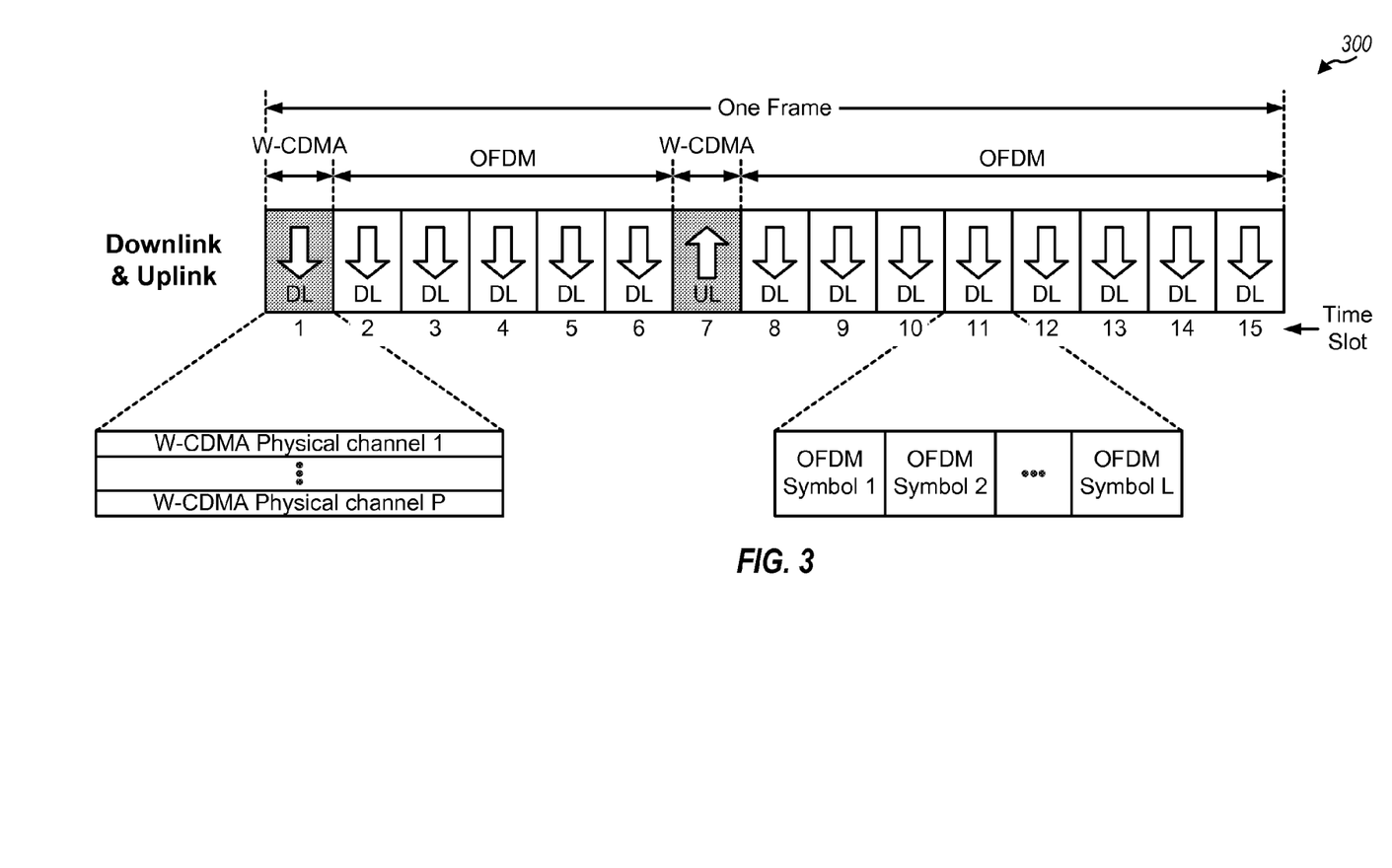
FIG. 3 shows multiplexing of W-CDMA and OFDM in a frame.

FIG. 3 shows an exemplary frame structure 300 for a time division duplexed (TDD) system that supports W-CDMA and OFDM. Each frame within a super-frame has a duration of 10 ms and is further partitioned into 15 time slots that are assigned indices of 1 through 15. Each time slot has a duration of 0.667 ms and spans 2560 chips. Each chip has a duration of 0.26 microseconds (µs) for a system bandwidth of 3.84 MHz.

For the example shown in FIG. 3, time slot 1 is used for a downlink (DL) W-CDMA slot, time slots 2 through 6 are used for downlink OFDM slots, time slot 7 is used for an uplink (UL) W-CDMA slot, and time slots 8 through 15 are used for downlink OFDM slots. For each downlink W-CDMA slot, data for one or more physical channels may be channelized with different orthogonal (e.g., OVSF) sequences, spectrally spread with scrambling codes, combined in the time domain, and transmitted across the entire W-CDMA slot. For each downlink OFDM slot, L OFDM symbols may be generated for the data to be sent in that OFDM slot, where L≥1. For example, three OFDM symbols may be sent in each downlink OFDM slot, and each OFDM symbol may have a duration of approximately 220 µs.

For a frequency division duplexed (FDD) system that supports W-CDMA and OFDM, the downlink and uplink are transmitted simultaneously on separate frequency bands. Each time slot on the downlink may be used for W-CDMA or OFDM.

FIGS. 2 and 3 show exemplary super-frame and frame structures. The transmission techniques described herein may be used for other systems with different radio technologies and for other super-frame and frame structures.

A base station may broadcast data to terminals within its coverage area. To improve broadcast coverage, the base station may employ techniques such as cyclic delay diversity, spatial spreading, and pilot staggering. For cyclic delay diversity, the base station generates OFDM symbols with different cyclic delays, which can introduce diversity and improve broadcast performance. For spatial spreading, the base station performs spatial processing with different steering vectors so that the broadcast transmission observes an ensemble of effective channels for each terminal. For pilot staggering, the base station transmits the FDM pilot on multiple sets of subbands so that (1) the amount of system resources used for the FDM pilot is not increased due to the use of multiple subband sets and (2) a terminal can derive a more accurate estimate of a wireless channel. These techniques are described in detail below.

Figure 4:
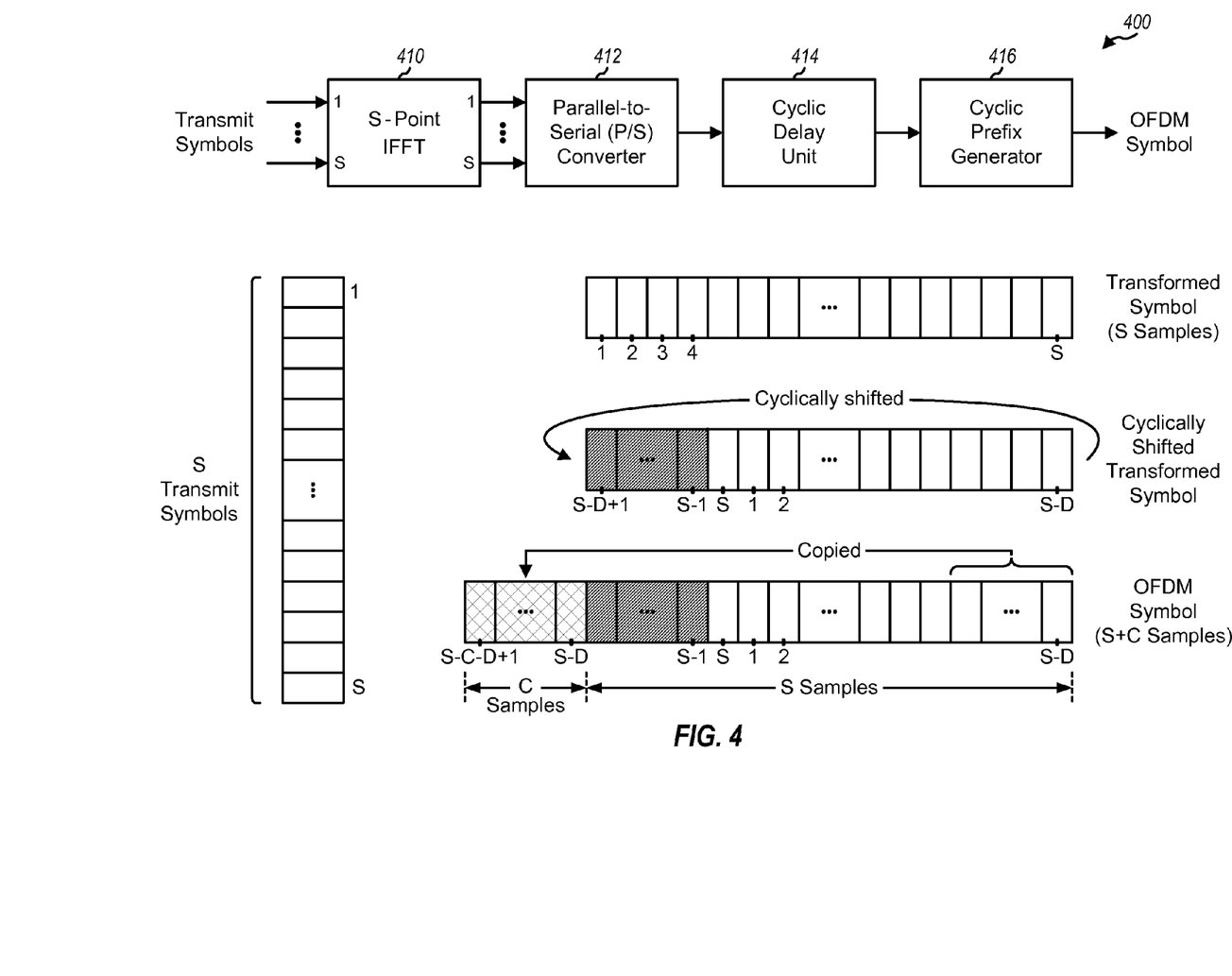
FIG. 4 shows an OFDM modulator for cyclic delay diversity.

FIG. 4 shows a block diagram of an OFDM modulator 400 that can generate OFDM symbols with different cyclic delay durations for cyclic delay diversity. The data to be transmitted is typically first encoded based on a coding scheme to generate code bits. The code bits are then mapped to modulation symbols based on a modulation scheme (e.g., M-PSK or M-QAM). Each modulation symbol is a complex value in a signal constellation for the modulation scheme.

In each OFDM symbol period, one modulation symbol may be sent on each subband used for transmission, and a zero symbol (which is a signal value of zero) is sent on each unused subband. The symbols to be sent on the S subbands are referred to as transmit symbols. In each OFDM symbol period, an inverse fast Fourier transform (IFFT) unit 410 receives S transmit symbols for the S subbands, transforms the S transmit symbols to the time domain with an S-point IFFT, and provides a transformed symbol that contains S time-domain samples. Each sample is a complex-value to be sent in one sample period. A parallel-to-serial (P/S) converter 412 serializes the S samples for the transformed symbol.

For cyclic delay diversity, a cyclic delay unit 414 cyclically or circularly delays the transformed symbol by D samples, where D is the amount of cyclic delay or cyclic delay duration. The cyclic delay is obtained by moving the last D samples of the transformed symbol to the front of the transformed symbol. The D cyclically delayed samples are shown with grey shading in FIG. 4. For OFDM modulation without cyclic delay diversity, D=0 and no samples are cyclically delayed or, equivalently, the cyclically delayed transformed symbol has a cyclic delay of 0 sample.

A cyclic prefix generator 416 then appends a cyclic prefix to the cyclically delayed transformed symbol and provides an OFDM symbol that contains S+C samples, where C is the cyclic prefix length. The cyclic prefix is obtained by copying the last C samples of the cyclically delayed transformed symbol and appending the copied samples to the front of the cyclically delayed transformed symbol. The C copies samples are shown with cross hashing in FIG. 4. The cyclic prefix is also called a guard interval or a guard period and is used to combat intersymbol interference caused by delay spread. An OFDM symbol period (which is also simply called a symbol period) is the duration of one OFDM symbol and is equal to S+C sample periods.

IFDMA symbols and LFDMA symbols may also be generated with different amounts of cyclic delay. The cyclic delay may be added prior to appending the cyclic prefix, as shown in FIG. 4. In general, cyclic delay may be introduced in multi-carrier modulation (MCM) symbols generated based on various multi-carrier radio technologies such as OFDM, IFDMA, LFDMA, and so on.

Cyclic delay diversity may be used by a base station with a single antenna as well as a base station with multiple antennas. For single-antenna cyclic delay diversity, different cyclic delay durations are used for OFDM symbols sent from a single antenna in different OFDM symbol periods. For multi-antenna cyclic delay diversity, different cyclic delay durations are used for OFDM symbols sent from multiple antennas in the same OFDM symbol period.

Figure 5:
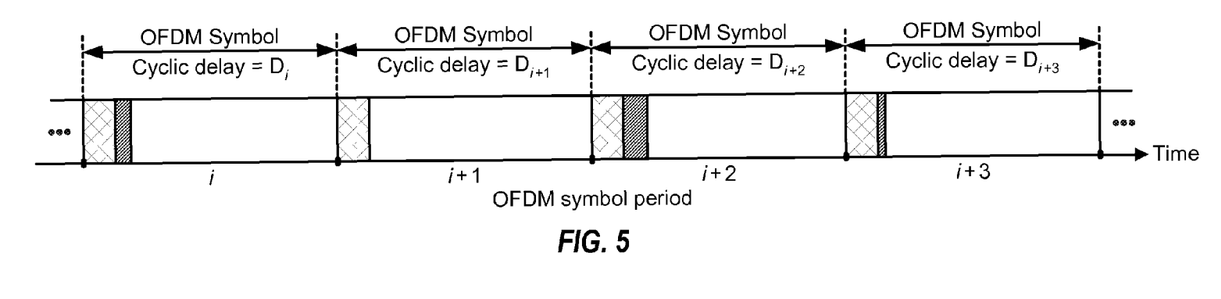
FIG. 5 shows cyclic delay diversity for a base station with a single antenna.

FIG. 5 shows cyclic delay diversity for a base station with a single antenna. Each OFDM symbol i is generated with a cyclic delay of $D_i$ samples selected for that OFDM symbol. The cyclic delay durations for different OFDM symbols may be selected in various manners. In one embodiment, the cyclic delay duration for each OFDM symbol is selected in a pseudo-random manner and results in a pseudo-random jitter being introduced in the OFDM symbol. For example, a cyclic delay diversity of either 0 or D samples may be pseudo-randomly selected for each OFDM symbol. In another embodiment, the cyclic delay duration for each OFDM symbol is selected in a deterministic manner, e.g., based on a predetermined delay pattern that indicates the cyclic delay duration for each OFDM symbol. For example, the delay pattern may indicate a cyclic delay of $D_1$ samples for OFDM symbol i, then a cyclic delay of $D_2$ samples for OFDM symbol i+1, and so on, then a cyclic delay of DG samples for OFDM symbol i+G−1, then a cyclic delay of $D_1$ samples for OFDM symbol i+G, and so on. For all embodiments, the cyclic delay durations for the OFDM symbols may be constrained to be within a predetermined range, e.g., $D_{max} \geq D_i \geq 0$, where $D_{max}$ is the maximum cyclic delay duration allowed for the OFDM symbols.

Single-antenna cyclic delay diversity can introduce diversity for broadcast transmissions and improve performance for various operating scenarios. As an example, consider a scenario in which a terminal is located between two base stations and receives the same broadcast transmissions from both base stations. If cyclic delay diversity is not employed, then the broadcast transmissions from these two base stations would statically arrive on top of one another and no diversity benefits are obtained. However, if cyclic delay diversity is employed, then the broadcast transmissions received from these base stations can combine in different manners depending on the cyclic delay durations used by these two base stations, and diversity is achieved for the broadcast transmissions. The same diversity benefits may be obtained for a terminal located between two sectors of the same base station if these sectors employ cyclic delay diversity.

Figure 6:
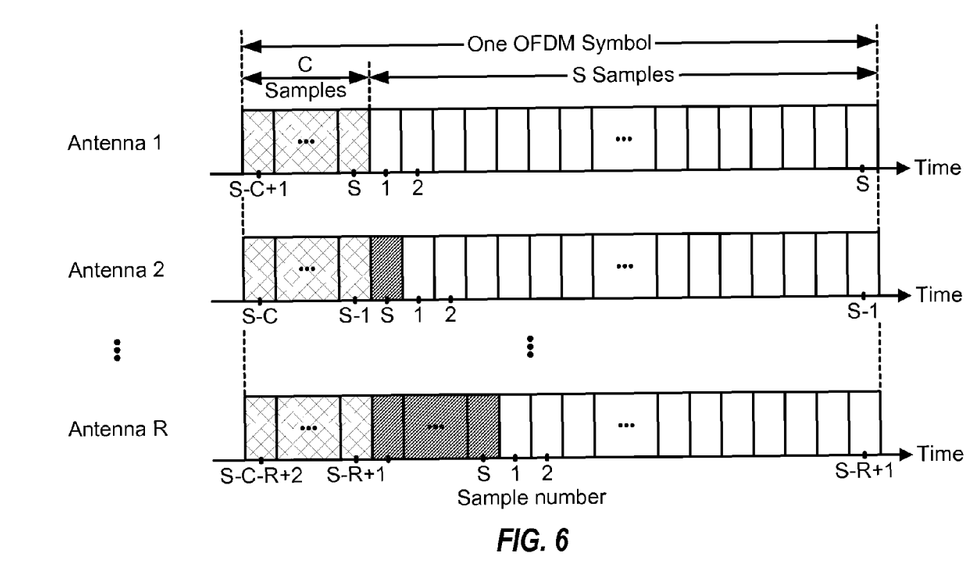
FIG. 6 shows cyclic delay diversity for a base station with multiple antennas.

FIG. 6 shows the use of cyclic delay diversity for a base station with multiple (R) antennas. For each OFDM symbol period, an S-point IFFT is performed on S transmit symbols to generate a transformed symbol containing S time-domain samples. The transformed symbol is then cyclically shifted by different amounts for the R antennas, e.g., by zero sample for antenna 1, by one sample for antenna 2, and so on, and by R−1 samples for antenna R. A cyclic prefix is then appended to the cyclically shifted transformed symbol for each antenna to generate an OFDM symbol for that antenna. R OFDM symbols with different cyclic delays of 0, 1, ..., R−1 samples are then transmitted from the R antennas in the same OFDM symbol period.

In one embodiment of multi-antenna cyclic delay diversity, the cyclic delay duration for each antenna is fixed. The R OFDM symbols sent simultaneously from the R base station antennas convolve with R channel responses and combine at a terminal antenna. Frequency selectivity is achieved due to possible inphase and out-of-phase combining of the OFDM symbols arriving at the terminal antenna. In another embodiment, the cyclic delay duration for each antenna is pseudo-randomly selected. In yet another embodiment, a set of cyclic delay durations is rotated through each antenna. For example, antenna 1 may be applied a cyclic delay of zero sample in symbol period i, then one sample in symbol period i+1, and so on, then R−1 samples in symbol period i+R−1, then zero sample in symbol period i+R, and so on. In yet another embodiment, cyclic delays of 0, 1, ..., R−1 samples are assigned to the R antennas in a pseudo-random or deterministic manner.

For both single antenna and multiple antennas, the cyclic delay diversity may be time varying. For example, the cyclic delay duration may be slowly varied within a range of $D_{min}$ to $D_{max}$ in each outer-frame, e.g., $D_{min}$=1 sample and $D_{max}$=5 samples. Time-varying cyclic delay diversity can introduce additional randomness and may reduce coverage holes. In addition, time variations in the cyclic delay diversity can effectively convert a slow fading channel into a fast fading channel. A faster fade rate can improve time diversity and is especially beneficial if each super-frame has a shorter duration. Cyclic delay diversity may be applied to all OFDM slots or selectively applied to some OFDM slots in each super-frame.

Cyclic delay diversity has the following characteristics.

Cyclic delay diversity introduces frequency selectivity in a wireless channel.

Time variations in the cyclic delay can change the frequency selectivity over time.

Cyclic delay diversity increases the effective length of the wireless channel by the cyclic delay duration.

The frequency selectivity introduced by cyclic delay diversity can distribute symbol errors across a data packet, which can improve coding performance. The frequency selectivity also reduces the probability of a single path Rayleigh channel.

The longer effective channel length with cyclic delay diversity may adversely impact broadcast performance. This possible adverse impact may be addressed as follows.

The cyclic prefix length may be selected to be sufficiently long so that the cyclic delay duration is small in comparison to the cyclic prefix length. For example, the cyclic prefix length may be 128 samples, and the cyclic delay duration may be limited to five samples, which is much less than 128 samples.

Pilot staggering may be used to allow the terminals to derive longer channel impulse response estimates.

Cyclic delay diversity provides diversity benefits due to the fact that multiple transmissions arriving at a terminal can combine in different manners with different cyclic delay durations. The terminal does not need to be aware of the cyclic delay introduced by the base stations and does not need to perform any additional processing to obtain the diversity benefits. The terminal can derive a sufficiently long channel impulse response estimate based on a staggered pilot and can also perform thresholding to zero out channel taps with low energy, e.g., less than a predetermined threshold. The cyclic delay would then be transparent to the terminal.

A base station with multiple antennas may perform spatial processing to improve broadcast coverage. With spatial spreading, the base station performs spatial processing with different steering vectors to effectively randomize the wireless channel for each terminal, so that broadcast performance is not dictated by a single channel realization.

The base station may perform spatial processing for spatial spreading as follows:

$$\underline{x}(s) = \underline{v}(s) \cdot d(s), \text{ for } s = 1, \ldots, S, \qquad \text{Eq (1)}$$

where d(s) is a modulation symbol to be sent on subband s;

$\underline{v}(s) = [v_1(s)\ v_2(s)\ \ldots\ v_R(s)]^T$ is an R×1 steering vector for subband s;

$\underline{x}(s) = [x_1(s)\ x_2(s)\ \ldots\ x_R(s)]^T$ is an R×1 vector with R transmit symbols to be sent from the R base station antennas on subband s; and "$T$" denotes a transpose.

The received symbols at a terminal may be expressed as:

$$\begin{aligned} r(s) &= \underline{h}(s) \cdot \underline{x}(s) + n(s), & \text{Eq (2)} \\ &= \underline{h}(s) \cdot \underline{v}(s) \cdot d(s) + n(s), \text{ for } s = 1, \ldots, S, \\ &= h_{\mathit{eff}}(s) \cdot d(s) + n(s), \end{aligned}$$

where r(s) is a received symbol for subband s;

$\underline{h}(s) = [h_1(s)\ h_2(s)\ \ldots\ h_R(s)]$ is an R×1 channel response row vector for subband s, where $h_l(s)$ is the complex gain between base station antenna l and the terminal antenna for subband s;

$h_{\mathit{eff}}(s) = \underline{h}(s) \cdot \underline{v}(s)$ is an effective channel response for subband s; and n(s) is the noise for subband s.

As shown in equation (2), the spatial processing by the base station results in the modulation symbol r(s) for each subband s observing the effective channel response $h_{\mathit{eff}}(s)$, which includes the actual channel response $\underline{h}(s)$ and the steering vector $\underline{v}(s)$. Different steering vectors $\underline{v}(s)$ may be used for different subbands to achieve different effective channels. The terminal can estimate the effective channel response $h_{\mathit{eff}}(s)$ for each subband based on the FDM pilot.

Various types of steering vectors may be used for spatial spreading. In an embodiment, the steering vectors are selected from the columns of a Fourier matrix. For an R×R Fourier matrix $\underline{F}$, the element $f_{n,m}$ in row n and column m of $\underline{F}$ may be expressed as:

$$f_{n,m} = e^{-j2\pi \frac{(n-1)(m-1)}{R}}, \qquad \text{Eq (3)}$$

for $n = 1, \ldots, R$ and $m = 1, \ldots, R$, where j is the imaginary value defined by $j = \sqrt{-1}$. The terms "n−1" and "m−1" in equation (3), instead of n and m, are due to an indexing scheme that starts with 1 instead of 0. Fourier matrices of any square dimension (e.g., 2, 3, 4, 5, and so on) may be formed.

In another embodiment, the steering vectors are selected from the columns of a Walsh matrix. A 2×2 Walsh matrix $\underline{W}_{2\times 2}$ and a larger size Walsh matrix $\underline{W}_{2Q \times 2Q}$ may be expressed as:

$$\underline{W}_{2\times 2} = \begin{bmatrix} 1 & 1 \\ 1 & -1 \end{bmatrix} \text{ and } \underline{W}_{2Q\times 2Q} = \begin{bmatrix} \underline{W}_{Q\times Q} & \underline{W}_{Q\times Q} \\ \underline{W}_{Q\times Q} & -\underline{W}_{Q\times Q} \end{bmatrix}. \qquad \text{Eq (4)}$$

Walsh matrices have dimensions that are powers of two (e.g., 2, 4, 8, and so on). For both Fourier and Walsh matrices, additional steering vectors may be obtained by multiplying the columns of these matrices with scalars of +1, −1, +1, −j, and so on.

In yet another embodiment, the elements of the steering vectors $\underline{v}(s)$ for the S subbands are defined as follows:

$$v_l(k) = e^{j\frac{2\pi \cdot (l-1) \cdot (s-1)}{S}}, \qquad \text{Eq (5)}$$
$$\text{for } l = 1, \ldots, R \text{ and } s = 1, \ldots, S,$$

where $v_l(s)$ is the weight for subband s of antenna l Equation (5) generates a different linear phase shift across the S subbands for each antenna. Each antenna l, for l=1, . . . , R, is associated with a phase slope of $2\pi \cdot (l-1)/S$. The phase shift for each subbands, for s=1, . . . , S, of antenna l is given as $2\pi \cdot (l-1) \cdot (s-1)/S$. The weights generated with equation (5) effectively form a different beam for each subband for a linear array of R equally spaced antennas.

The steering vectors $\underline{v}(s)$ derived based on equation (5) may be viewed as a linear filter having a discrete frequency response of $G_l(s)$ for each antenna l. A discrete time-domain impulse response $g_l(n)$ for the linear filter may be obtained by performing an S-point IFFT on the discrete frequency response $G_l(s)$. The impulse response $g_l(n)$ for antenna % has a single tap with unit-magnitude at a delay of l sample periods and is zero at all other delays. The spatial spreading with the steering vectors $\underline{v}(s)$ derived based on equation (5) is thus equivalent to multi-antenna cyclic delay diversity described above and shown in FIG. 6.

A base station may transmit a staggered pilot to allow a terminal to derive a longer channel impulse response estimate while limiting the amount of system resources used for pilot transmission. The terminal can estimate the channel gain for each subband used for pilot transmission. The terminal can then derive a channel impulse response estimate based on the channel gains for all subbands used for pilot transmission. The length of the channel impulse response estimate is determined by the number of subbands used for pilot transmission. If the pilot is transmitted on multiple sets of subbands in different symbol periods, then the terminal can (1) sample the system bandwidth on more subbands in the frequency domain and (2) derive a longer and higher quality channel impulse response estimate.

Figure 7A:
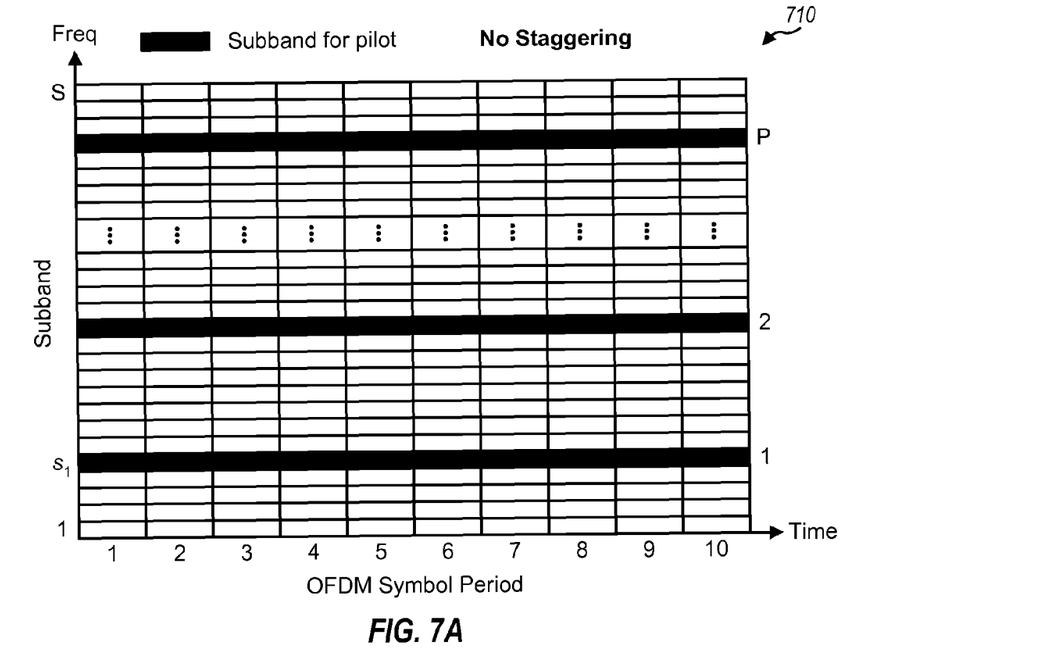
FIGS. 7A, 7B and 7C show FDM pilots with no staggering, 2× staggering, and complete staggering, respectively.

FIG. 7A shows an FDM pilot transmission scheme 710 without staggering. For scheme 710, the FDM pilot is transmitted on one set of P subbands. The P subbands in the set are uniformly distributed across the S total subbands such that consecutive subbands in the set are separated by a distance of $\Delta = S/P$ subbands. The set thus contains subbands $s_1$, $\Delta + s_1$, $2\Delta + s_1$, and so on, where the starting subband index $s_1$ may be any integer value between 1 and $\Delta$. The FDM pilot is transmitted on the same set of P subbands in each OFDM symbol period in which the FDM pilot is transmitted.

Figure 7B:
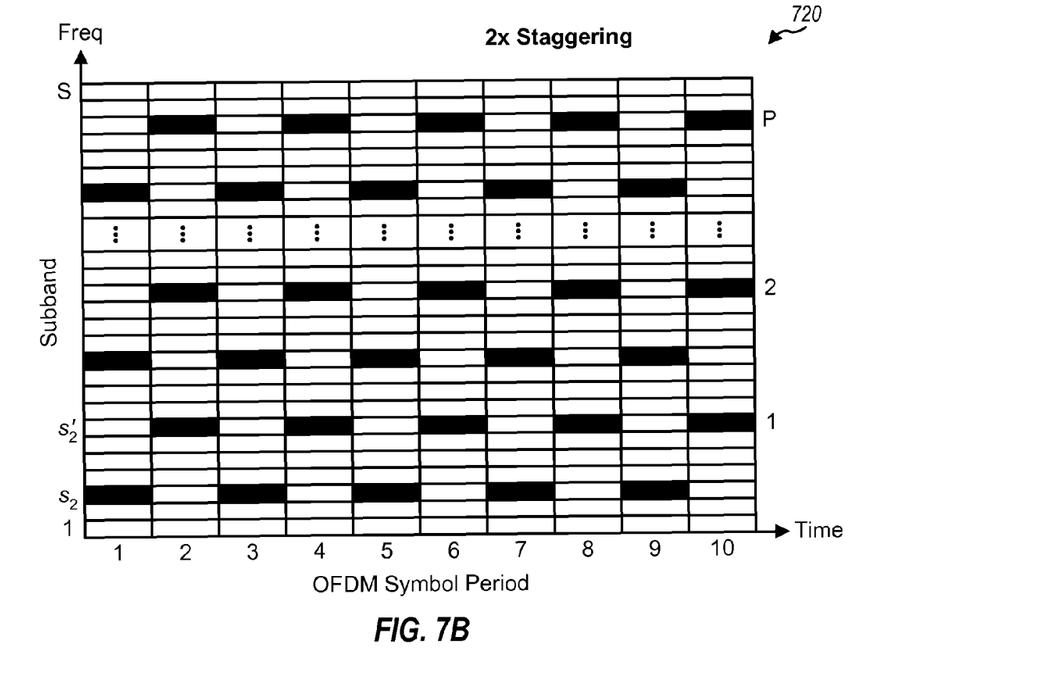

FIG. 7B shows an FDM pilot transmission scheme 720 with 2× staggering. For scheme 720, the FDM pilot is transmitted on two sets of P subbands. The P subbands in each set are uniformly distributed across the S total subbands. The P subbands in the first set are also offset from the P subbands in the second set by $\Delta/2$ subbands. The first set contains subbands $s_2$, $\Delta + s_2$, $2\Delta + s_2$, and so on, and the second set contains subbands $s'_2$, $\Delta + s'_2$, $2\Delta + s_2$, and so on. The starting subband index $s_2$ may be any integer value between 1 and $\Delta/2$, and index $s'_2$ may be $s'_2 = s_2 + \Delta/2$. The FDM pilot may be transmitted on the two subband sets in alternating symbol periods, e.g., on the first subband set in odd-numbered symbol periods, and on the second subband set in even-numbered symbol periods.

Figure 7C:
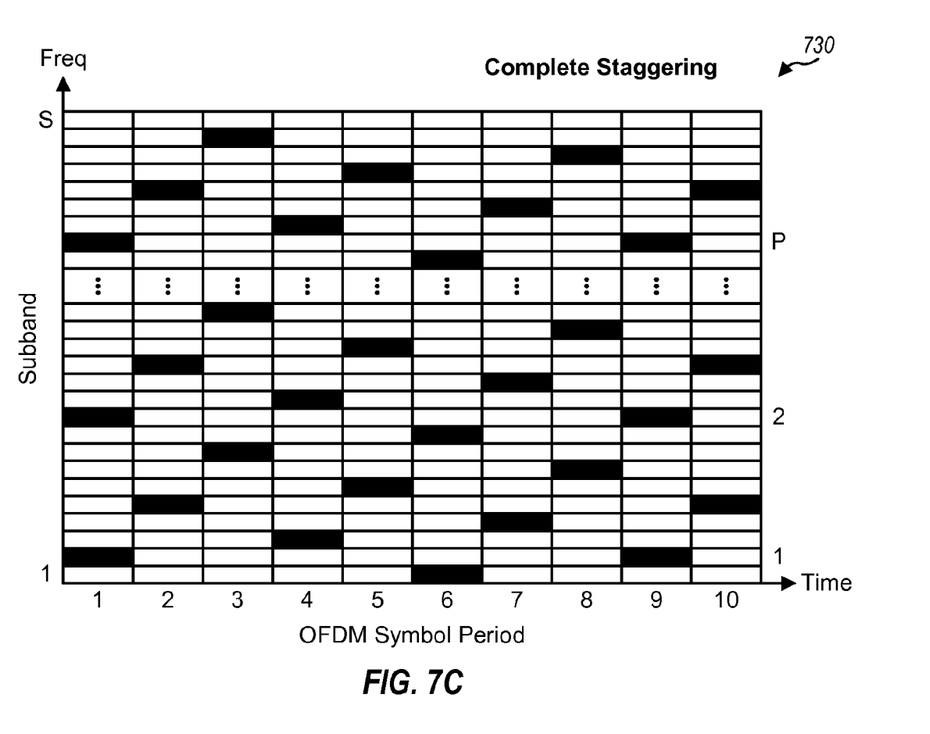

FIG. 7C shows an FDM pilot transmission scheme 730 with complete staggering. For scheme 730, the FDM pilot is transmitted on $\Delta$ sets of P subbands. The P subbands in each set are uniformly distributed across the S total subbands. The FDM pilot may be cycled through the $\Delta$ subband sets in each $\Delta$-symbol period interval based on a staggering pattern that indicates which subband to use for the FDM pilot in each symbol period. For the example shown in FIG. 7C, the FDM pilot is transmitted using a staggering pattern of {0, 3, 6}, which means that the subband set used for the FDM pilot in each symbol period is offset by three subbands from the subband set used in the preceding symbol period.

In general, the number of subbands in each set (P) is typically selected based on the desired amount of overhead for the FDM pilot, the expected delay spread in the system, and/or other factors. For the examples shown in FIGS. 7A through 7C, $\Delta$ is equal to eight, and 12.5% of the S total subbands are used for the FDM pilot.

FIGS. 7A through 7C show three exemplary FDM pilot transmission schemes. The FDM pilot may also be transmitted in other manners, and this is within the scope of the invention. In general, the FDM pilot may be transmitted on any number of subband sets, and each set may contain any number of subbands. The FDM pilot may also be transmitted with various staggering patterns.

Pilot staggering can provide various benefits. First, pilot staggering can combat excess delay spread, which is a delay spread that is longer than the cyclic prefix length. The delay spread of a wireless channel is the time span or duration of an impulse response for the wireless channel. This delay spread is also the difference between the earliest and latest arriving signal instances at a receiver for a signal transmitted via the wireless channel by a transmitter. If an FDM pilot is sent on P subbands, then a channel impulse response estimate with P channel taps may be derived based on this FDM pilot. Typically, P is selected to be equal to C. When excess delay spread is not present, the channel impulse response contains C taps or fewer, and all of the taps can be estimated based on the FDM pilot sent on P subbands. However, when excess delay spread is present, the channel impulse response contains more than C taps, with the first C taps corresponding to a main channel and the remaining taps corresponding to an excess channel. The excess channel taps cannot be estimated based on the FDM pilot sent on P subbands because an insufficient number of degrees of freedom exists. Furthermore, the impulse response of the wireless channel is undersampled in the frequency domain by the P pilot subbands. This undersampling causes aliasing of the excess channel in the time domain so that the excess channel taps wrap around and overlap the main channel taps. Each aliased excess channel tap causes error in the estimation of the corresponding main channel tap. A staggered pilot allows for Nyquist sampling of the wireless channel even in the presence of excess delay spread and therefore avoids an aliased channel estimate. By transmitting the FDM pilot on more subbands using staggering, more channel taps may be estimated and the degradation in channel estimation due to excess delay spread may be mitigated.

Pilot staggering may improve channel estimation performance when cyclic delay diversity is employed. Cyclic delay diversity effectively increases the delay spread of a wireless channel by the cyclic delay duration. Pilot staggering allows for estimation of a longer channel impulse response due to cyclic delay diversity.

Figure 8:
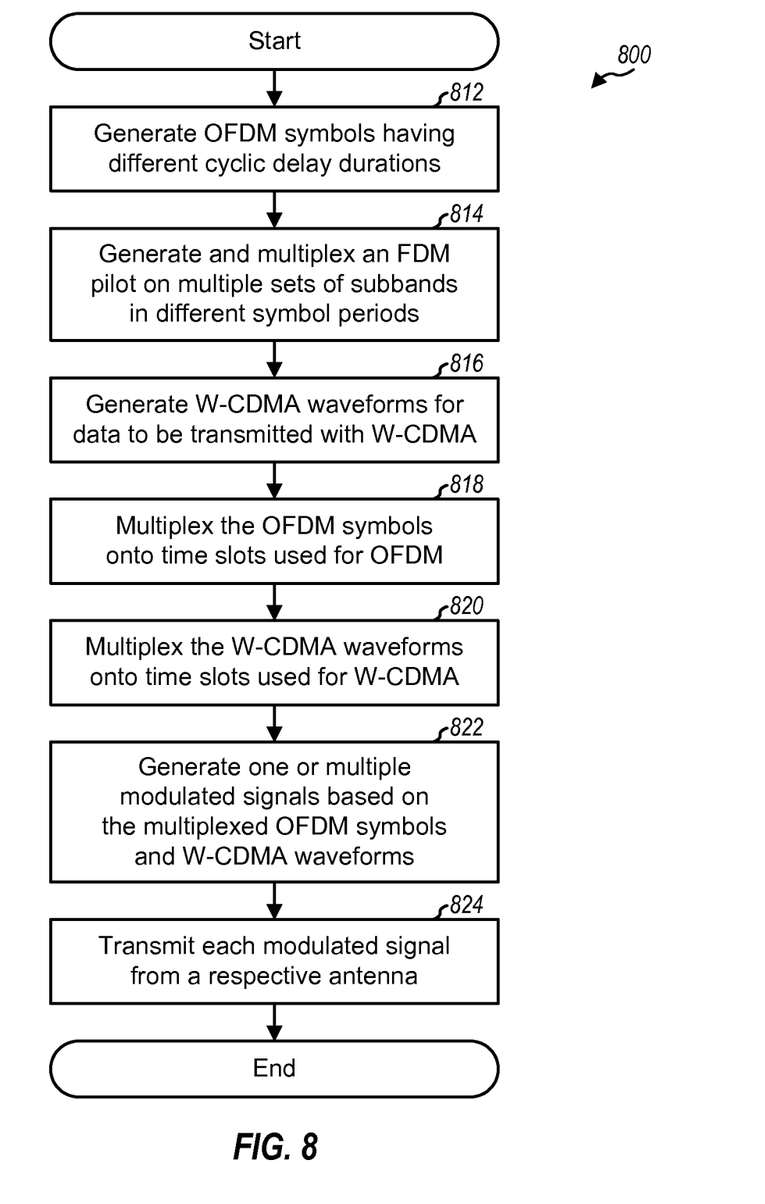
FIG. 8 shows a process for transmitting data with cyclic delay diversity and pilot staggering.

FIG. 8 shows a process 800 for transmitting data with cyclic delay diversity and pilot staggering. Process 800 may be performed in each super-frame. Initially, OFDM symbols having different cyclic delay durations are generated based on modulation symbols (block 812). If multiple antennas are available and if spatial spreading is employed, then the modulation symbols may be spatially processed with different steering vectors to generate transmit symbols, and the OFDM symbols may be generated based on the transmit symbols. The cyclic delay duration for each OFDM symbol may be selected in a pseudo-random manner or a deterministic manner. The cyclic delay durations for the OFDM symbols may also be selected to be time varying with respect to the cyclic delay durations for OFDM symbols transmitted by a neighboring base station. Cyclic delay diversity may be applied to all OFDM symbols or selectively applied to a subset of the OFDM symbols.

An FDM pilot is generated and multiplexed on multiple sets of subbands in different symbol periods, one subband set in each symbol period (block 814). For example, the FDM pilot may be multiplexed on a first subband set in odd-numbered symbol periods and on a second subband set in even-numbered symbol periods. The FDM pilot may also be multiplexed on all subbands usable for data transmission.

W-CDMA waveforms are generated for data to be transmitted with W-CDMA (block 816). The OFDM symbols are multiplexed onto time slots used for OFDM (block 818), and the W-CDMA waveforms are multiplexed onto time slots used for W-CDMA (block 820). A single modulated signal may be generated based on the multiplexed OFDM symbols and W-CDMA waveforms (block 822) and transmitted from a single antenna (block 824). Alternatively, at least two modulated signals may be generated based on the multiplexed OFDM symbols and W-CDMA waveforms and transmitted from at least two antennas. In this case, for each time slot used for OFDM, at least two OFDM symbols with different cyclic delay durations are generated and transmitted from the at least two antennas.

Figure 9:
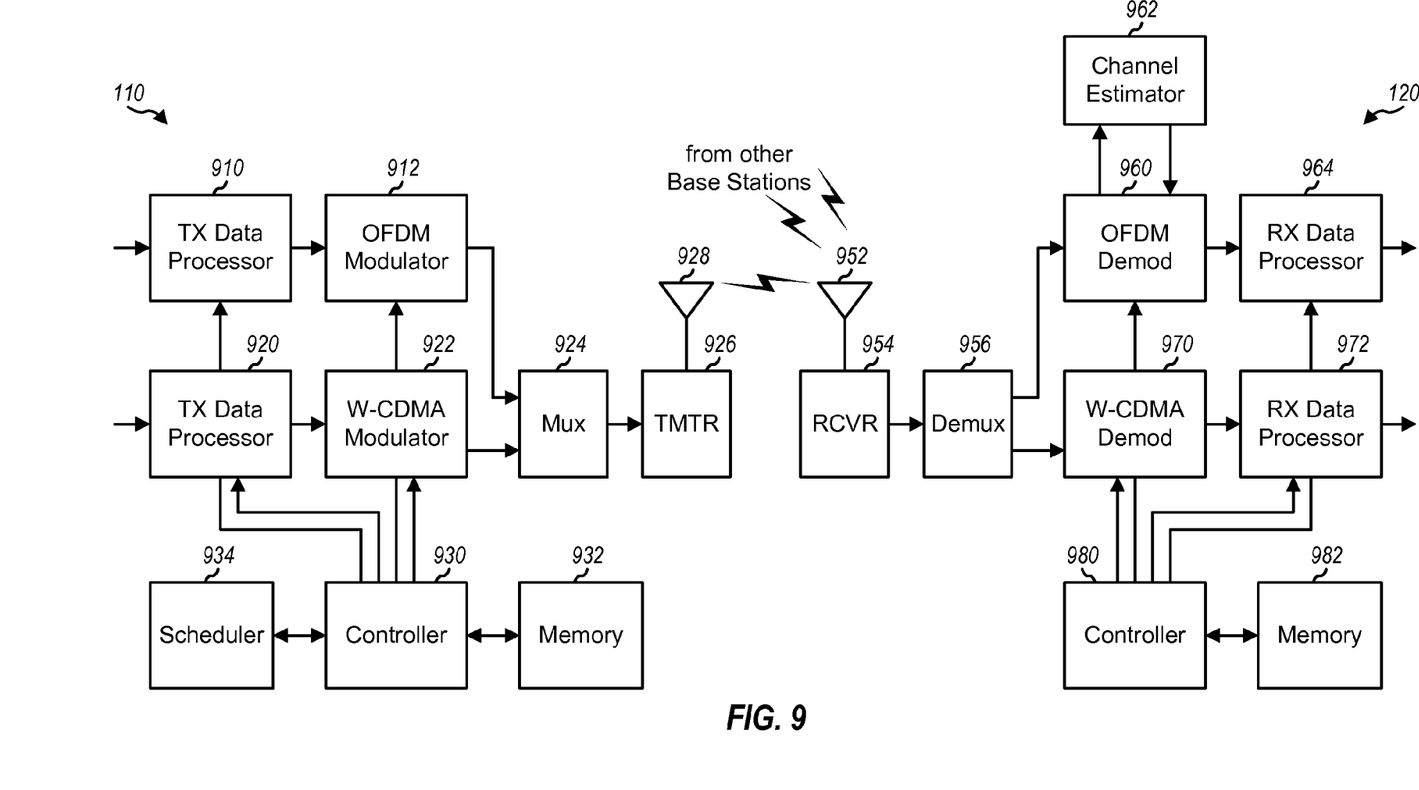
FIG. 9 shows a block diagram of a base station and a terminal.

FIG. 9 shows a block diagram of a single-antenna base station 110 and a single-antenna terminal 120. At base station 110, an OFDM transmit (TX) data processor 910 receives and processes (e.g., encodes, interleaves, and symbol maps) traffic data to be transmitted with OFDM and generates data symbols, which are modulation symbols for traffic data. Data processor 910 also generates a TDM pilot and an FDM pilot based on the staggering selected for use. An OFDM modulator 912 performs OFDM modulation on the data and pilot symbols (e.g., as shown in FIG. 4), generates OFDM symbols with different cyclic delay durations for cyclic delay diversity, and forms an OFDM waveform for each OFDM slot. A W-CDMA TX data processor 920 receives and processes data to be transmitted with W-CDMA and generates coded data for W-CDMA. A W-CDMA modulator 922 processes the W-CDMA coded data and generates a W-CDMA waveform for each W-CDMA slot. The processing by W-CDMA modulator 922 includes (1) mapping the coded data for each W-CDMA physical channel to modulation symbols, (2) channelizing the modulation symbols for each physical channel with an orthogonal sequence, (3) scrambling the channelized symbols for each physical channel with a scrambling code, and (4) scaling and summing the scrambled data for all physical channels. A multiplexer (Mux) 924 multiplexes OFDM waveforms onto OFDM slots, multiplexes W-CDMA waveforms onto W-CDMA slots, and provides an output signal. A transmitter (TMTR) 926 conditions (e.g., converts to analog, filters, amplifies, and frequency upconverts) the output signal and generates a modulated signal that is transmitted from an antenna 928.

At terminal 120, an antenna 952 receives the modulated signals transmitted by base station 110 and other base stations in the system. A receiver (RCVR) 954 conditions, digitizes, and processes the received signal from antenna 952 and provides a stream of input samples to a demultiplexer (Demux) 956. Demultiplexer 956 provides input samples from OFDM slots to an OFDM demodulator (Demod) 960 and provides input samples from W-CDMA slots to a W-CDMA demodulator 970. OFDM demodulator 960 performs OFDM demodulation on the input samples (e.g., complementary to the OFDM modulation shown in FIG. 4) and obtains received data and pilot symbols. A channel estimator 962 derives a channel impulse response estimate and/or a channel frequency response estimate based on the received pilot symbols. OFDM demodulator 960 further performs detection (e.g., equalization) on the received data symbols with the channel estimate from channel estimator 962 and provides data symbol estimates, which are estimates of the transmitted data symbols. An OFDM receive (RX) data processor 964 processes (e.g., symbol demaps, deinterleaves, and decodes) the data symbol estimates and provides decoded data for OFDM. W-CDMA demodulator 970 processes the input samples in a manner complementary to the processing by W-CDMA modulator 922 and provides symbol estimates. A W-CDMA RX data processor 972 processes (e.g., demodulates, deinterleaves, and decodes) the symbol estimates and provides decoded data for W-CDMA. In general, the processing at terminal 120 is complementary to the processing at base station 110.

Controllers 930 and 980 direct the operation at base station 110 and terminal 120, respectively. Memory units 932 and 982 store program codes and data used by controllers 930 and 980, respectively. Controller 930 and/or a scheduler 934 schedules transmissions on the downlink, determines whether to use W-CDMA or OFDM for each time slot, and allocates time slots to the scheduled transmissions.

The transmission techniques described herein may be used for transmissions on the downlink, as described above. These techniques may also be used for transmissions on the uplink.

The transmission techniques described herein may be implemented by various means. For example, these techniques may be implemented in hardware, software, or a combination thereof. For a hardware implementation, the processing units used for cyclic delay diversity, spatial spreading, and/or pilot staggering at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a terminal may also be implemented within one or more ASICs, DSPs, processors, and so on.

For a software implementation, the transmission techniques may be implemented with modules (e.g., procedures, functions, and so on) that perform the functions described herein. The software codes may be stored in a memory unit (e.g., memory unit 932 or 982 in FIG. 9) and executed by a processor (e.g., controller 930 or 980). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    a receiver to receive Orthogonal Frequency Division Multiplexing (OFDM) symbols from at least two base stations including a first base station and a second base station, wherein the OFDM symbols received from the first base station have different cyclic delay durations than the OFDM symbols received from the second base station; and
    a demodulator to process the received OFDM symbols to recover data transmitted by the at least two base stations, wherein processing the received OFDM symbols to recover the data comprises combining the OFDM symbols received from the at least two base stations.

2. The apparatus of claim 1, wherein the cyclic delay durations are selected in a deterministic manner.

3. The apparatus of claim 1, wherein the cyclic delay durations for the OFDM symbols from the first base station are time varying with respect to the cyclic delay durations for the OFDM symbols from the second base station.

4. The apparatus of claim 1, further comprising:
    a channel estimator to receive a frequency division multiplexed (FDM) pilot on a plurality of sets of frequency subbands in different symbol periods and to derive a channel estimate based on the FDM pilot.

5. The apparatus of claim 1, further comprising:
    a demultiplexer to demultiplex the received OFDM symbols from time slots used for OFDM and to demultiplex waveforms sent with a second radio technology from time slots used for the second radio technology.

6. The apparatus of claim 1, wherein the cyclic delay durations are selected in a pseudo-random manner.

7. A method of receiving data in a wireless communication system, comprising:
    receiving Orthogonal Frequency Division Multiplexing (OFDM) symbols from at least two base stations including a first base station and a second base station, wherein the OFDM symbols received from the first base station have different cyclic delay durations than the OFDM symbols received from the second base station; and
    processing the received OFDM symbols to recover data transmitted by the at least two base stations, wherein processing the received OFDM symbols to recover the data comprises combining the OFDM symbols received from the at least two base stations.

8. The method of claim 7, further comprising:
    receiving a frequency division multiplexed (FDM) pilot on a plurality of sets of frequency subbands in different symbol periods, one set of subbands in each symbol period; and
    deriving a channel estimate based on the FDM pilot.

9. The method of claim 7, further comprising:
    demultiplexing the received OFDM symbols from time slots used for OFDM; and
    demultiplexing waveforms sent with a second radio technology from time slots used for the second radio technology.

10. The method of claim 7, wherein the cyclic delay durations are selected in a pseudo-random manner or a deterministic manner.

11. The method of claim 7, wherein the cyclic delay durations for the OFDM symbols from the first base station are time varying with respect to the cyclic delay durations for the OFDM symbols from the second base station.

12. An apparatus comprising:
    means for receiving Orthogonal Frequency Division Multiplexing (OFDM) symbols from at least two base stations including a first base station and a second base station, wherein the OFDM symbols received from the first base station have different cyclic delay durations than the OFDM symbols received from the second base station; and
    means for processing the received OFDM symbols to recover data transmitted by the at least two base stations, wherein processing the received OFDM symbols to recover the data comprises combining the OFDM symbols received from the at least two base stations.

13. The apparatus of claim 12, further comprising:
    means for receiving a frequency division multiplexed (FDM) pilot on a plurality of sets of frequency subbands in different symbol periods, one set of subbands in each symbol period; and
    means for deriving a channel estimate based on the FDM pilot.

14. The apparatus of claim 12, further comprising:
    means for demultiplexing the received OFDM symbols from time slots used for OFDM; and
    means for demultiplexing waveforms sent with a second radio technology from time slots used for the second radio technology.

15. The apparatus of claim 12, wherein the cyclic delay durations are selected in a pseudo-random manner or a deterministic manner.

16. The apparatus of claim 12, wherein the cyclic delay durations for the OFDM symbols from the first base station are time varying with respect to the cyclic delay durations for the OFDM symbols from the second base station.

17. A non-transitory computer-readable medium having instructions thereon, the instructions comprising:
    code for causing a wireless terminal to receive Orthogonal Frequency Division Multiplexing (OFDM) symbols from at least two base stations including a first base station and a second base station, wherein the OFDM symbols received from the first base station have different cyclic delay durations than the OFDM symbols received from the second base station; and
    code for causing the wireless terminal to process the received OFDM symbols to recover data transmitted by the at least two base stations, wherein processing the received OFDM symbols to recover the data comprises combining the OFDM symbols received from the at least two base stations.

18. The computer-readable medium of claim 17, wherein the cyclic delay durations are selected in a pseudo-random manner or a deterministic manner.

19. The computer-readable medium of claim 17, wherein the cyclic delay durations for the OFDM symbols from the first base station are time varying with respect to the cyclic delay durations for the OFDM symbols from the second base station.

20. The computer-readable medium of claim 17, wherein the instructions further comprise:
   code for causing the wireless terminal to receive a frequency division multiplexed (FDM) pilot on a plurality of sets of frequency subbands in different symbol periods, one set of subbands in each symbol period; and
   code for causing the wireless terminal to derive a channel estimate based on the FDM pilot.

21. The computer-readable medium of claim 17, wherein the instructions further comprise:
   code for causing the wireless terminal to demultiplex the received OFDM symbols from time slots used for OFDM; and
   code for causing the wireless terminal to demultiplex waveforms sent with a second radio technology from time slots used for the second radio technology.

* * * * *